W. R. UHLEMANN.
LENS MOUNTING.
APPLICATION FILED MAY 29, 1909.

933,502.  Patented Sept. 7, 1909.

Attest:
John Enders.
M. H. Holmes.

Inventor:
William R. Uhlemann,
by Robert Burns
Attorney

UNITED STATES PATENT OFFICE.

WILLIAM R. UHLEMANN, OF CHICAGO, ILLINOIS.

LENS-MOUNTING.

933,502.  Specification of Letters Patent.  Patented Sept. 7, 1909.

Original application filed March 29, 1909, Serial No. 486,485. Divided and this application filed May 29, 1909. Serial No. 499,245.

*To all whom it may concern:*

Be it known that I, WILLIAM R. UHLEMANN, a citizen of the United States of America, and a resident of Chicago, in the county of Cook and State of Illinois, have invented certain new and useful Improvements in Lens-Mountings, of which the following is a specification.

This invention relates to frameless eyeglasses and spectacles, and more especially to that class of eyeglasses in which the lenses are carried by a rigid bridge to which are pivotally connected the nose grips by which the eyeglasses are supported on the nose of the wearer.

The present improvement is a division of the subject matter of my original application for Letters Patent Serial Number 486,485, filed March 29, 1909, and has for its object to provide a simple and effective connection between a rimless lens and its carrying yoke or clip, and by which a durable attachment is attained in a manner which permits of a limited elastic movement between the parts adapted to very effectively prevent accidental breakage of the lens, all as will hereinafter more fully appear.

Figure 1:
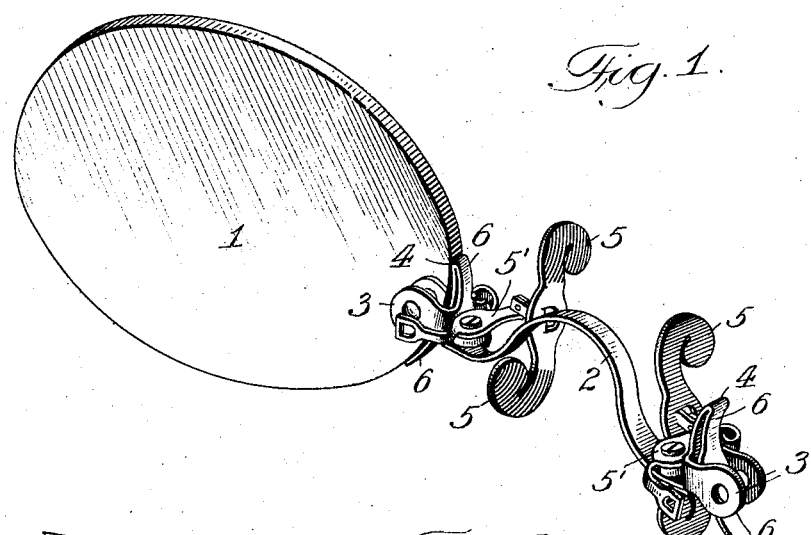
Figure 2:
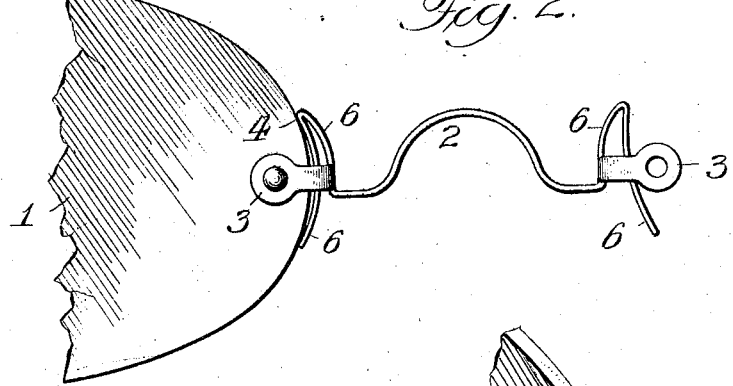
Figure 3:
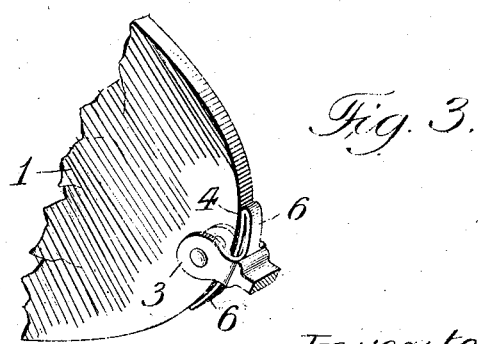

In the accompanying drawings: Figure 1, is a perspective view of a finger piece eyeglass mounting embodying the present improvement. Fig. 2, is a detail elevation of the attachment between the lens and the bridge of a rimless eyeglass. Fig. 3, is a detail perspective view of the same changed for either the saddle or for the end pieces of the temples of rimless spectacles.

Similar numerals of reference indicate like parts in the different views.

Referring to the drawings, 1 represents a lens of a rimless eyeglass, and 2 the rigid arched bridge by which a pair of lenses are connected together in proper spaced relation, and to such end the bridge is provided with attaching clips or straps 3 and braces 4 which engage the edges of the rimless lenses in the usual manner. Such bridge also affords pivotal bearing for the carrying levers or arms 5' of the nose piece or grips 5 of the mounting.

The construction shown in Fig. 1 as illustrative of the application of the present improvement to finger piece eyeglass mountings constitutes the subject matter of my application for Letters Patent Serial Number 486,485, filed March 29, 1909, and of which the present application is a division.

The material part of the present improvement involves a resilient connection of the lens to the mounting, and involves a formation in which each of the aforesaid braces 4 consists of a tongue 6 connected to the heel of the clip and bent to form substantially parallel separated members one being free ended and lying between the other and the edge of the lens. With such construction a resilient brace is provided which permits of a limited independent movement between the lens and the clip adapted to prevent in a very effective manner the danger of an accidental breakage of the lens. While said resilient tongues 6, are preferably formed integral with the eyeglass bridge and clips aforesaid, as shown in Figs. 1 and 2, it is within the scope of the present invention to make said tongues integral with the clips 3, or otherwise permanently attached thereto, and in turn to attach said clips by brazing or other usual means to the ends of a spectacle saddle or to the pivot members of the spectacle temples.

Having thus fully described my said invention what I claim as new and desire to secure by Letters Patent, is:—

1. A lens attachment comprising, a clip having attaching ears and a resilient brace consisting of a tongue connected to the heel of the clip and bent to form substantially parallel separated members one being free ended and lying between the other and the edge of the lens, substantially as set forth.

2. A lens attachment comprising, a clip having attaching ears and a resilient brace consisting of a tongue connected to the heel of the clip and bent to form substantially parallel separated members one being free ended and lying between the other and the edge of the lens, the said tongue forming an integral part of the clip substantally as set forth.

Signed at Chicago, Illinois, this 27th day of May, 1909.

WILLIAM R. UHLEMANN.

Witnesses:
R. H. UHLEMANN,
H. B. LANE.